United States Patent [19]
Tang et al.

[11] Patent Number: 5,336,405
[45] Date of Patent: Aug. 9, 1994

[54] FILTER CARTRIDGE END CAP ASSEMBLY

[75] Inventors: Yuan-Ming Tang, New Brighton; Gregory H. C. Stephan, Stillwater, both of Minn.

[73] Assignee: Minnesota Mining and Manufacturing Company, St. Paul, Minn.

[21] Appl. No.: 512,141

[22] Filed: Apr. 20, 1990

[51] Int. Cl.$^5$ .............................. B01D 27/08
[52] U.S. Cl. .......................... 210/232; 210/484; 210/497.01; 55/500; 55/502
[58] Field of Search ................... 29/163.8, 525; 156/73.1, 305, 218; 210/232, 484, 493.2, 497.01, 500.38, 500.4, 500.41; 55/497, 498, 500, 502, 504, DIG. 5

[56] References Cited

U.S. PATENT DOCUMENTS

| | | | |
|---|---|---|---|
| 4,392,958 | 7/1983 | Ganzi et al. | 210/493.2 |
| 4,512,892 | 4/1985 | Ganzi et al. | 210/493.2 |
| 4,842,739 | 6/1989 | Tang | 210/489 |
| 4,861,479 | 8/1989 | Solzer | 210/493.2 |
| 4,878,930 | 11/1989 | Manniso et al. | 210/493.2 |
| 4,961,850 | 10/1990 | Combest | 210/232 |

FOREIGN PATENT DOCUMENTS 2140317  11/1984  United Kingdom ............ 210/493.2

Primary Examiner—Robert A. Dawson
Assistant Examiner—W. L. Walker
Attorney, Agent, or Firm—Gary L. Griswold; Walter N. Kirn; David W. Anderson

[57] ABSTRACT

A filter cartridge is provided with an end cap and a lock ring which capture a filter element therebetween on assembly and which include projections extending beyond the outer surfaces of the end cap and the lock ring. The application of heat to the projections causes the material of the projections to fuse together and provide a leak-proof seal between the end cap, the lock ring and the filter material.

6 Claims, 1 Drawing Sheet

FILTER CARTRIDGE END CAP ASSEMBLY

BACKGROUND OF THE INVENTION

The present invention relates to filter cartridges for fluids and more particularly, to high surface area, replaceable filter cartridges for gas or liquid filtration applications.

Efforts to increase the effective filter area while minimizing filtration unit size have led to a variety of filter arrangements in which a flat filter sheet is folded into a pleated structure. The pleated filter element is then assembled in a filter cartridge which provides support for the filter and the necessary structure for channeling the fluid to be filtered through the filter element. One such filter and filter cartridge is described in U.S. Pat. No. 4,842,739, which is incorporated herein by reference.

The present invention improves on the subject matter described in the above patent by increasing the structural integrity of the filter cartridge and the interface between the filter element and the filter cartridge to prevent leakage of the final assembly.

SUMMARY OF THE INVENTION

The present invention improves upon the subject matter of U.S. Pat. No. 4,842,739 by providing a leak-proof end cap assembly for a filter cartridge including a tubular filter element comprising an annular end cap having an inner surface, an outer surface, an outer, substantially circular circumference connecting the inner and the outer surfaces and having a diameter over which the inner surface of the filter element may be drawn and an annular projection adjacent the circumference and extending beyond the outer surface; an annular lock ring having an inner surface, an outer surface, an inner annular surface sized to capture the filter element between the lock ring inner surface and the end cap outer circumference and a projection adjacent the lock ring inner surface and extending beyond the lock ring outer surface a distance substantially equal to the extension of the end cap projection so that, when the end cap and the lock ring are assembled to capture the filter element, and with the end cap outer surface and the lock ring outer surface aligned, the end cap projection and the lock ring projection extend substantially equally from the end cap and the lock ring outer surfaces; wherein the projections are supplied so that heat may be applied to the projections after assembly of the lock ring to the end cap to fuse the lock ring to the end cap to provide a leak-proof seal therebetween.

The present invention also includes a method of producing a leak-proof seal for a filter cartridge including the steps of providing a tubular filter element, providing an annular end cap having an inner surface, an outer surface, an outer, substantially circular circumference connecting the inner and the outer surfaces and having a diameter over which the inner surface of the filter element may be drawn and an annular projection adjacent the circumference and extending beyond the outer surface, providing an annular lock ring having an inner surface, an outer surface, an inner annular surface sized to capture the filter element between the lock ring inner surface and the end cap outer circumference and a projection adjacent the lock ring inner surface and extending beyond the lock ring outer surface a distance substantially equal to the extension of the end cap projection so that, when the end cap and the lock ring are assembled to capture the filter element, and with the end cap outer surface and the lock ring outer surface aligned, the end cap projection and the lock ring projection extend substantially equally from the end cap and the lock ring outer surfaces, trimming the filter element to substantially the extension of the end cap projection and the lock ring projection from the end cap outer surface and the lock ring outer surface, and applying heat to the end cap projection, the lock ring projection and the filter element captured therebetween to fuse the material of the end cap projection to the lock ring projection to provide a leak-proof seal between the end cap and the lock ring.

BRIEF DESCRIPTION OF THE DRAWINGS

The present invention will be more particularly described with respect to the accompanying drawings, wherein like numbers refer to like parts in the several views and wherein.

DETAILED DESCRIPTION OF THE PREFERRED EMBODIMENT

Figure 1:
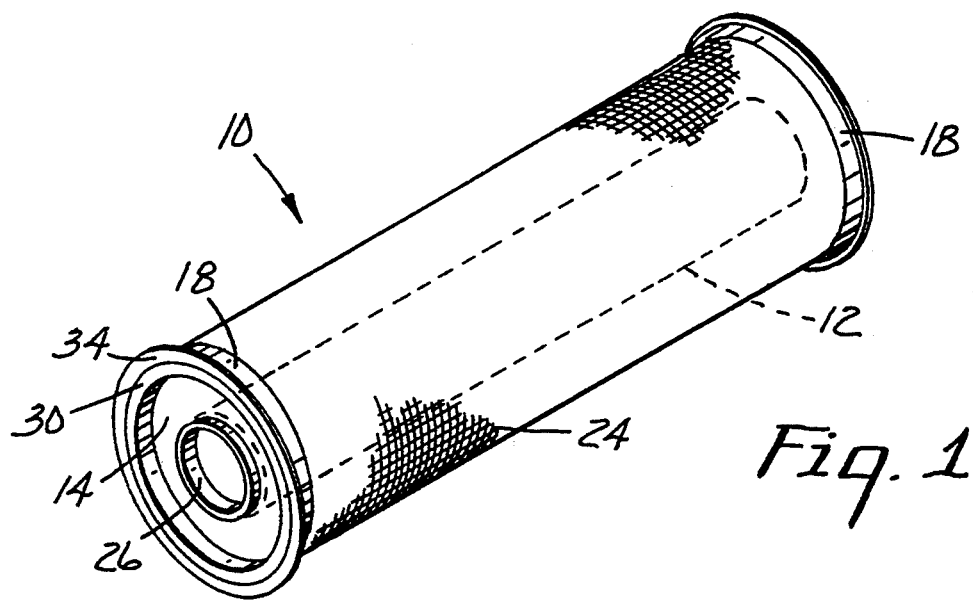
FIG. 1 is a perspective view of a filter cartridge of the present invention.

As shown in FIGS. 1-4, the subject of the present invention is a filter cartridge, generally indicated as 10, which includes a porous support tube 12, to which are connected two end caps 14 and two lock rings 18 which mate with the end caps 14 to capture opposite ends of a filter element 22 therebetween. An end cap 14 and a lock ring 18 form in combination an end cap assembly for the filter cartridge 10. Overlying the filter element 22 is a protective screen 24. The protective screen 24 and the support tube 12 prevent deformation of the filter element 22 in use. In operation, the filter cartridge 10 is supplied with a fluid to be filtered, either liquid or gas, through an end opening 26 of the support tube 12. The fluid flows through the filter element 22 and exits the filter cartridge 10 through the protective screen 24. The direction of flow may be reversed so that the fluid to be filtered enters the protective screen 24 and exits through the support tube 12.

The general configuration of a filter cartridge thus far described is found in U.S. Pat. No. 4,842,739 which is incorporated herein by reference. The present invention provides an improved method of sealing the lock rings 18 to the end caps 14 to prevent leakage of the fluid to be filtered in its flow between the support tube opening 26 and the protective screen 24.

Figure 2:
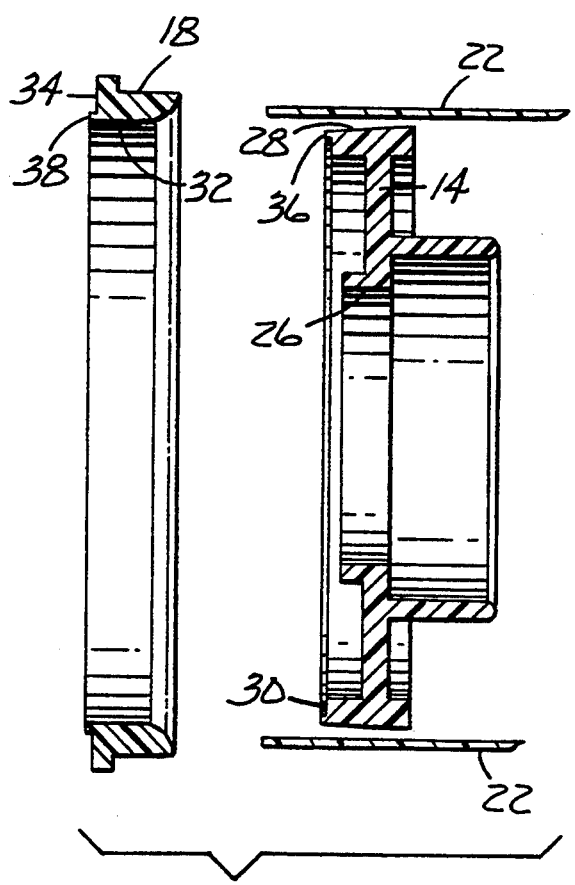
FIG. 2 is a partial, exploded cross-sectional view of the filter cartridge of FIG. 1.
Figure 3:
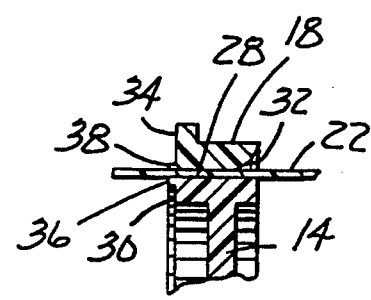
FIG. 3 is a partial, cross-sectional view of the filter cartridge of FIG. 1 shown in an assembled configuration.
Figure 4:
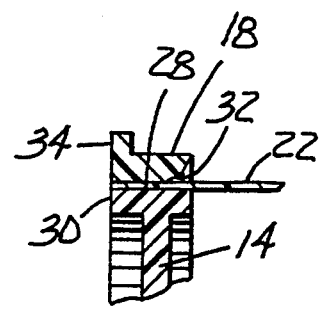
FIG. 4 is a view identical to that shown in FIG. 3, but after final heat fusing.

As shown in FIGS. 2-4, assembly of the filter cartridge is accomplished by stretching the filter element 22 over the outer circumference 28 of the end caps 14 so that the filter element extends past the outer surfaces 30 of the end caps 14. The lock rings 18 are then forced over the end caps 14 and the filter element 22 to capture the filter element 22 between the end caps 16 and the lock rings 18. It is preferred that the outer circumferences 28 of the end caps 14 and the inner annular surfaces 32 of the lock rings 18 be complimentarily tapered to facilitate assembly of the lock rings 18 to the end caps 14. The lock rings 18 are forced over the filter element 22 and the end caps 14 until the outer surfaces 34 of the lock rings 18 are aligned with the outer surfaces 30 of the end caps 14, as shown in FIG. 3.

Both the end caps 14 and the lock rings 18 are provided at their outer surfaces 30 and 34, respectively, with projections 36 and 38, again respectively, which extend equal distances beyond the outer surfaces 30 and 34 of the end caps 14 and the lock rings 18 when the lock rings 18 are assembled to the end caps 14. These projections 36 and 38 are included to provide material which may be fused by the application of heat to seal the lock rings 18 to the end caps 14. After the lock rings 18 have been assembled to the end caps 14 in the manner shown in FIG. 3, the filter element 22 extending beyond the extent of the projections 36 and 38 is preferably trimmed to the level of the projections 36 and 38 and heat is applied to melt the projections 36 and 38, and the filter element 22 therebetween, to fuse the materials comprising the projections 38 of the lock rings 18, the filter element 22 and the projections 36 of the end caps 14 to produce a seamless seal between the lock rings 18 and the end caps 14.

A critical aspect of the design of the lock rings 18 and the end caps 14 is the provision of the projections 36 and 38. The projections 36 and 38 provide a quantity of material, when heated, which allows the material comprising the lock rings 18 and the end caps 14 to flow together with each other and the material comprising the filter element 22. The projections 36 and 38 provide a high spot on the end cap assembly which makes it considerably easier to contact the proper area with the source of heat and, because the projections 36 and 38 have a relatively small volume, the amount of heat required and the time of contact with the heat source is minimized, thus decreasing assembly cycle times and reducing the possibility of heat distortion of the end cap assemblies.

Although the projections 36 and 38 are illustrated as being coextensive with the outer circumferences 28 of the end caps 14 and the inner annular surfaces 32 of the lock rings 18, neither positioning is necessary. The projections 36 and 38 may be spaced somewhat from the edges of the lock rings 18 or the end caps 14, so long as the projections 36 and 38 are located close enough to provide material to the joint of the lock rings 18 and the end caps 14 upon heating of the projections 36 and 38. It also is not necessary the the projections 36 and 38 have the cross-sectional shape illustrated. It is the volume of material included in the projections 36 and 38, not the shape in which this material is provided, which is important.

The preferred method of applying heat to the the lock rings 18 and the end caps 14 is by use of a heated ring which is forced against the projections 36 and 38. Other methods of applying heat include ultrasonic welding or hot air or flame impingement. It has been found to be preferred to trim the filter element 22 extending beyond the projections 36 and 38 so that a neat appearance and a sound joint is produced, but this step may be omitted if the extension of the filter element is not too great.

In order that proper fusing of the lock rings 18, the end caps 14 and the filter element 22 occurs, it is necessary that the material making up these elements be compatible and capable of fusing to each other. It is not necessary that the materials of these elements be identical, but merely that the various materials be capable of fusion. The preferred material for the filter element is a thermoplastic material including, but not limited to polyolefins, polyamides, polyesters, polycarbonates and polysulfones. If such materials are used for the filter element 22, it has been found possible and useful to use an identical material for the lock rings 18 and the end caps 14. Although such thermoplastic materials are preferred, it has been found possible to produce filter elements 22 from other materials such as fiberglass or metal, in which case the material of the lock rings 18 and end caps 14 should likewise be made of these materials, or at least a material which will fuse with each other and with the material of the filter element upon the application of heat.

It is possible to produce a filter cartridge 10 according to the present invention which uses a material for the filter element which will not fuse with the materials which comprise the end caps 14 or the lock rings 18, so long as the materials of the lock rings 18 and the end caps 14 are fusible with each other and can flow into and/or through the material of the filter element 22 to a degree sufficient to completely seal the joint between the lock rings 18 and the end caps 14.

Although the present invention has been described with respect to only a single embodiment, it is recognized that modifications may be made to the invention without departing from the spirit and scope of the appended claims. For example, the filter cartridge and the end cap assemblies have been illustrated as having circular or cylindrical shapes. It is contemplated that any circumferential shape could be utilized, so long as the filter element is a continuous tube.

We claim:

1. An end cap assembly for a filter cartridge including a tubular filter element comprising:

an end cap having an inner surface, an outer surface, an outer circumference connecting said inner and said outer surfaces and having dimensions such that the inner surface of said filter element may be drawn over said circumference, and a projection coextensive with said circumference and extending beyond said outer surface, said projection having a small volume relative to said end cap volume;

a lock ring having an inner surface, an outer surface, an inner circumferential surface connecting said inner and said outer surfaces and sized to capture said filter element between said lock ring inner circumferential surface and said end cap outer circumference and a projection coextensive with said lock ring inner circumferential surface and having a small volume relative to said lock ring volume and extending beyond said lock ring outer surface a distance substantially equal to the extension of said end cap projection so that, when said end cap and said lock ring are assembled to capture said filter element, and with said end cap outer surface and said lock ring outer surface aligned, said end cap projection and said lock ring projection extend substantially equally from said end cap and said lock ring outer surfaces and capture said filter element therebetween;

said projections being supplied so that heat may be applied to said projections after assembly of said lock ring to said end cap to fuse said lock ring to said end cap to provide a leak-proof seal therebetween.

2. An end cap assembly according to claim 1 wherein the materials comprising said lock ring and said end cap are fusible.

3. An end cap assembly according to claim 2 wherein said materials comprising said filter element, said lock ring and said end cap are fusible.

4. An end cap assembly according to claim 2 wherein said materials comprising said lock ring and said end cap are thermoplastic polymers.

5. An end cap assembly according to claim 1 wherein said end cap circumference and said lock ring inner circumferential surface are complimentarily tapered to facilitate assembly.

6. An end cap assembly according to claim 5 wherein said end cap circumference and said lock ring inner circumferential surface are circular.

* * * * *